United States Patent

Ikemoto et al.

(10) Patent No.: US 11,205,342 B2
(45) Date of Patent: Dec. 21, 2021

(54) TRAFFIC INFORMATION PROCESSING DEVICE

(71) Applicant: TOYOTA JIDOSHA KABUSHIKI KAISHA, Toyota (JP)

(72) Inventors: Koichi Ikemoto, Nagoya (JP); Keiji Yamashita, Nisshin (JP); Koji Taguchi, Sagamihara (JP); Shin Sakurada, Toyota (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 16/680,883

(22) Filed: Nov. 12, 2019

(65) Prior Publication Data

US 2020/0211373 A1 Jul. 2, 2020

(30) Foreign Application Priority Data

Dec. 27, 2018 (JP) .............................. JP2018-245296

(51) Int. Cl.
*G08G 1/01* (2006.01)
*G06K 9/00* (2006.01)
*G08G 1/00* (2006.01)
*G08G 1/052* (2006.01)
(Continued)

(52) U.S. Cl.
CPC ....... *G08G 1/0125* (2013.01); *G06K 9/00825* (2013.01); *G08G 1/0112* (2013.01); *G08G 1/0137* (2013.01); *G08G 1/052* (2013.01); *G08G 1/202* (2013.01); *H04N 5/2253* (2013.01); *G05D 1/0088* (2013.01); *G05D 2201/0213* (2013.01)

(58) Field of Classification Search
CPC ...... G08G 1/0125; G08G 1/202; G08G 1/052; G08G 1/0137; G08G 1/0112; G05D 2201/0213; G05D 1/0088; H04N 5/2253; G06K 9/00825
See application file for complete search history.

(56) References Cited

U.S. PATENT DOCUMENTS

2013/0328698 A1* 12/2013 Ramachandran .... G08G 1/0141
340/905
2017/0369055 A1* 12/2017 Saigusa ................ G08G 1/0116
2019/0103028 A1* 4/2019 Kobayashi ........... G01C 21/362

FOREIGN PATENT DOCUMENTS

JP 2011-134195 A 7/2011
JP 2017-182137 A 10/2017

* cited by examiner

*Primary Examiner* — Hunter B Lonsberry
*Assistant Examiner* — Mathew Franklin Gordon
(74) *Attorney, Agent, or Firm* — Sughrue Mion, PLLC

(57) ABSTRACT

A traffic information processing device includes a communication unit configured to communicate through a communication network with a plurality of communication vehicles configured to detect relative positions and relative speeds of vehicles around a host vehicle with respect to the host vehicle, an information acquisition unit configured to acquire position and speed information of the communication vehicle and position and speed information of vehicles around the communication vehicle from each of the communication vehicles traveling in a specific area through the communication unit, and a traffic state prediction unit configured to predict a future change in a traffic state of a road in the specific area based on the position and speed information from the communication vehicles acquired by the information acquisition unit.

14 Claims, 6 Drawing Sheets

(51) Int. Cl.
*H04N 5/225* (2006.01)
*G05D 1/00* (2006.01)

TRAFFIC INFORMATION PROCESSING DEVICE

INCORPORATION BY REFERENCE

The disclosure of Japanese Patent Application No. 2018-245296 filed on Dec. 27, 2018, including the specification, drawings and abstract is incorporated herein by reference in its entirety.

BACKGROUND

1. Technical Field

The disclosure relates to a traffic information processing device.

2. Description of Related Art

There is a known traffic information processing device configured to detect a traffic state of a road such as a congestion state based on information transmitted from each vehicle traveling on the road and transmits information on the detected traffic state of the road to vehicles traveling around the road (for example, Japanese Unexamined Patent Application Publication No. 2011-134195 (JP 2011-134195 A)).

In particular, in the traffic information processing device according to JP 2011-134195 A, an average speed of vehicles in a predetermined section is compared with a congestion determination speed corresponding to a road type in the predetermined section by a system mounted on each vehicle, and determination is made whether the predetermined section is congested based on the comparison result. The determination result is transmitted from each vehicle to a server, and the server collects congestion information in various sections.

In addition, in the traffic information processing device according to JP 2011-134195 A, the front is imaged by a camera mounted on the vehicle, and when there are a constant number of vehicles or more in the captured image, the predetermined section where the vehicle is traveling is determined to be congested.

SUMMARY

By the way, in the device described in JP 2011-134195 A, the presence or absence of the congestion is determined based on the determination result of the presence or absence of the congestion transmitted from a specific vehicle that can communicate with the server. Here, in reality, it is assumed that only some of the vehicles traveling on the road can communicate with the server to transmit the determination result of the presence or absence of the congestion, and remaining vehicles cannot substantially transmit the determination result of the presence or absence of the congestion to the server due to the lack of a communication apparatus or a prediction system of the congestion. Therefore, in the device described in JP 2011-134195 A, the presence or absence of the congestion is determined based on the speed information of some vehicles traveling on the road in the predetermined section.

However, for example, when a future traffic state such as a future congestion state is predicted in addition to a current congestion state, prediction accuracy may be low only with the information from some vehicles that can communicate with the server.

The disclosure improves prediction accuracy of a future traffic state by also using information of a vehicle that cannot communicate with a server.

The gist of the disclosure is as follows.

(1) A first aspect of the disclosure relates to a traffic information processing device including a communication unit, an information acquisition unit, and a traffic state prediction unit. The communication unit is configured to communicate through a communication network with a plurality of communication vehicles configured to detect relative positions and relative speeds of vehicles around a host vehicle with respect to the host vehicle. The information acquisition unit is configured to acquire position and speed information of the communication vehicle and position and speed information of vehicles around the communication vehicle from each of the communication vehicles traveling in a predetermined area through the communication unit. The traffic state prediction unit configured to predict a future change in a traffic state of a road in the area based on the position and speed information from the communication vehicles acquired by the information acquisition unit.

(2) In the traffic information processing device according to the first aspect, at least some of the communication vehicles are autonomously traveling vehicles configured to provide mobility services and autonomously travel toward set destinations. The device further includes a vehicle allocation instruction unit configured to set the destination of one autonomously traveling vehicle not boarded by a user at a position in a non-transmitted region in which the position and speed information from the communication vehicles is not transmitted over a predetermined time or more when the non-transmitted region is present in the area.

(3) In the traffic information processing device according to the second aspect, when a road in one advancing direction is congested on the road around the non-transmitted region, the vehicle allocation instruction unit sets the destination on the road in the non-transmitted region and in an advancing direction opposite to the one advancing direction.

(4) In the traffic information processing device according to any one of the first to third aspects, the traffic state of the road is a congestion state of the road.

(5) In the traffic information processing device according to the third aspect, the traffic state prediction unit predicts a future change in the congestion state of the road based on road information and weather information of each road in addition to the position and speed information.

(6) In the traffic information processing device according to any one of the first to fifth aspects, the traffic state prediction unit transmits a prediction result of the traffic state to the communication vehicles through the communication unit.

(7) The traffic information processing device according to any one of the first to sixth aspects may further include a head specification unit configured to specify a head position of congestion occurring on a road in the area based on the position and speed information from the communication vehicles acquired by the information acquisition unit. The communication vehicle is provided with an out-of-vehicle camera that images surroundings of the communication vehicle. The information acquisition unit further acquires an image captured by the out-of-vehicle camera from the communication vehicle traveling in the predetermined area. The traffic state prediction unit specifies a cause of the congestion based on the image acquired by the information acquisition unit in relation to a road near the congestion head specified by the head specification unit and estimates the future change in the traffic state of the road based on the specified congestion cause.

(8) In the traffic information processing device according to the seventh aspect, at least some of the communication vehicles are the autonomously traveling vehicles configured to provide the mobility services and autonomously travel toward the set destinations. The device further includes vehicle allocation instruction unit configured to set the destination of one autonomously traveling vehicle not boarded by a user at a position near the congestion head when the image is not acquired by the information acquisition unit in relation to the road near the congestion head.

According to the disclosure, it is possible to improve the prediction accuracy of the future traffic state by also using the information of the vehicle that cannot communicate with the server.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
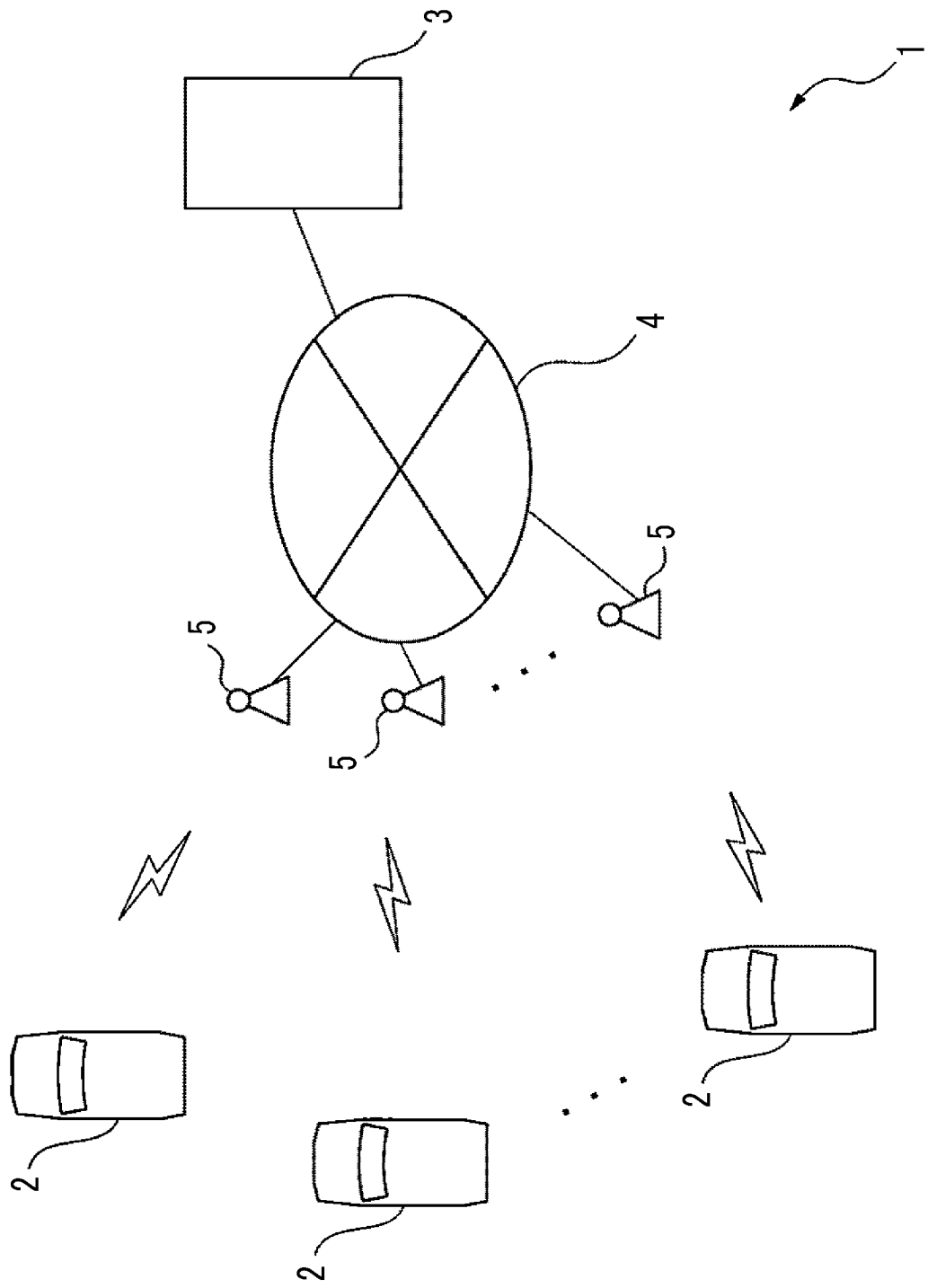
FIG. 1 is a schematic configuration diagram of a traffic information processing system in which a traffic information processing device according to one embodiment is mounted.

Hereinafter, embodiments will be described in detail with reference to drawings. In the following description, the same reference numeral is assigned to a similar component.

Configuration of Traffic Information Processing System

First, a configuration of a traffic information processing system configured to process traffic information such as congestion information will be described with reference to FIGS. 1 to 3. FIG. 1 is a schematic configuration diagram of the traffic information processing system in which a traffic information processing device according to one embodiment is mounted. A traffic information processing system 1 predicts a traffic state of a road in an area based on information from vehicles traveling in the specific area and transmits a prediction result to the vehicles traveling in the area.

As shown in FIG. 1, the traffic information processing system 1 includes a plurality of vehicles 2 that can perform communication and a server 3 configured to function as a traffic information processing device. Each of the vehicles 2 and the server 3 are configured to be able to communicate with each other through a communication network 4 formed by an optical communication line or the like and a wireless base station 5 connected to the communication network 4 through a gateway (not shown). The communication between the vehicle 2 and the wireless base station 5 is in compliance with a predetermined communication standard.

In this embodiment, some of the vehicles 2 are autonomous driving vehicles that autonomously travel. Therefore, each vehicle 2 travels autonomously based on a traveling plan created by the vehicle 2 or the server 3 and a driver for operating the vehicle 2 is not needed. Further, the vehicle 2 transmits, to the server 3, information on relative positions or relative speeds of vehicles around a host vehicle acquired from an out-of-vehicle sensor described below. The vehicle 2 may be a vehicle that does not travel autonomously as long as the out-of-vehicle sensor that can acquire the information on the relative positions and relative speeds of the vehicles around the host vehicle is included.

Figure 2:
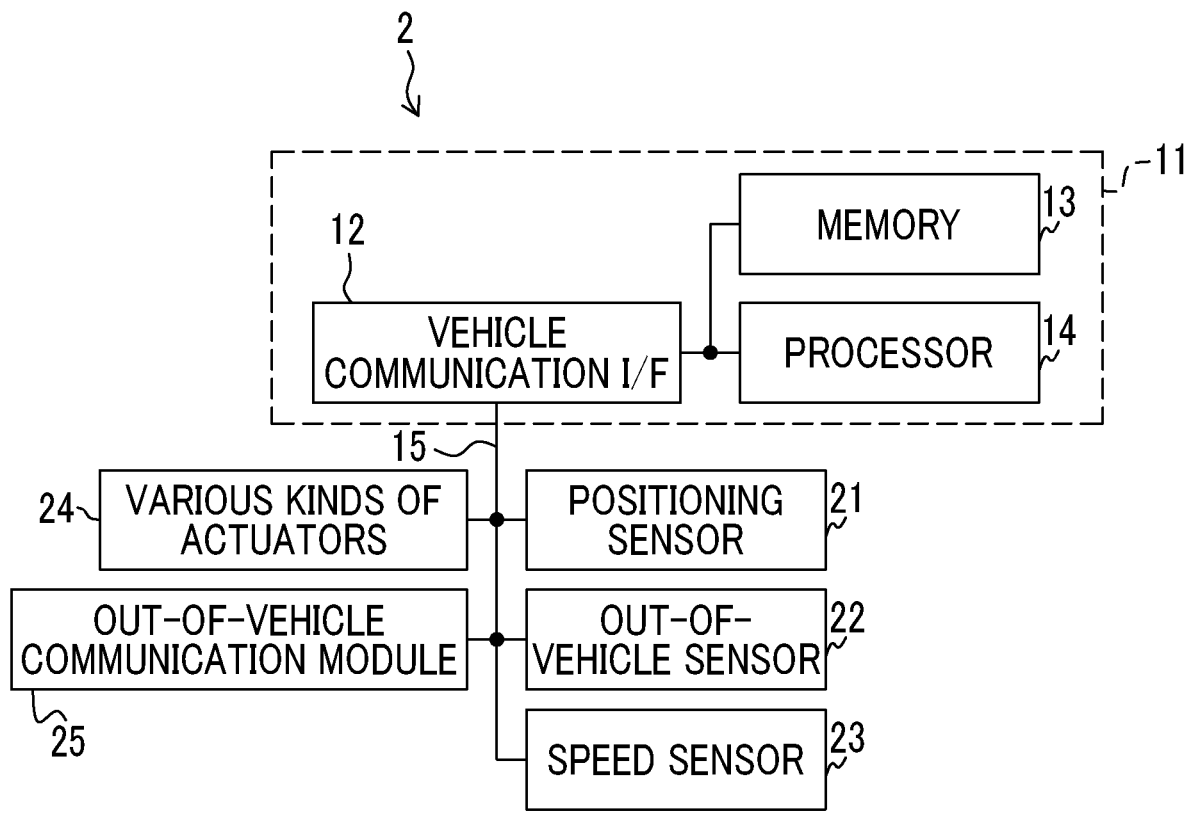
FIG. 2 is a diagram schematically showing a configuration of a vehicle.

FIG. 2 is a diagram schematically showing a configuration of the vehicle 2. As shown in FIG. 2, the vehicle 2 includes an electronic control unit (ECU) 11. The ECU 11 includes an in-vehicle communication interface 12, a memory 13, and a processor 14. The in-vehicle communication interface 12 and the memory 13 are connected to the processor 14 through signal lines. In this embodiment, the vehicle 2 is provided with one ECU 11, but a plurality of ECUs separated for each function may be provided.

The in-vehicle communication interface 12 includes an interface circuit for connecting the ECU 11 to an in-vehicle network 15 in compliance with a standard such as a controller area network (CAN). The ECU 11 communicates with other on-vehicle apparatuses through the in-vehicle communication interface 12.

The memory 13 is an example of a storage unit configured to store data. The memory 13 includes, for example, a volatile semiconductor memory (for example, RAM) and a non-volatile semiconductor memory (for example, ROM). The memory 13 stores a computer program for executing various kinds of processing in the processor 14, various pieces of data used when various pieces of processing are executed by the processor 14, or the like.

The processor 14 includes one or a plurality of central processing units (CPUs) and peripheral circuits of the CPUs. The processor 14 may further include a graphics processing unit (GPU) or an arithmetic circuit such as a logical arithmetic unit or a numerical arithmetic unit. The processor 14 executes various kinds of processing based on the computer program stored in the memory 13.

As shown in FIG. 2, the vehicle 2 further includes a positioning sensor 21, an out-of-vehicle sensor 22, a speed sensor 23, various kinds of actuators 24, and an out-of-vehicle communication module 25.

The positioning sensor 21 is a sensor for detecting a current position of the vehicle 2. The positioning sensor 21 is, for example, a global positioning system (GPS) configured to receive signals from three or more GPS satellites and detects the current position of the vehicle 2 (for example, the latitude and longitude of the vehicle 2). The positioning sensor 21 is connected to the ECU 11 through the in-vehicle network 15 and transmits the detected current position information of the vehicle 2 to the ECU 11.

The out-of-vehicle sensor 22 is a sensor for detecting surrounding information of the vehicle 2. The surrounding information includes information on other vehicles that are traveling or stopped around the vehicle 2. In addition, the surrounding information may include information such as a road white line, a pedestrian, a bicycle, a building, a sign, a traffic light, and an obstacle. Examples of the out-of-vehicle sensor 22 include an out-of-vehicle camera, a millimeter wave radar, a laser imaging detection and ranging (LIDAR), and an ultrasonic sensor. The out-of-vehicle camera among the out-of-vehicle sensors images the surroundings of the vehicle. The out-of-vehicle sensor 22 is connected to the ECU 11 through the in-vehicle network 15 and transmits the detected surrounding information of the vehicle 2 to the ECU 11.

The speed sensor 23 is a sensor for detecting the speed of the vehicle 2. The speed sensor 23 detects, for example, a rotation speed of an axle (not shown) connected to the wheels of the vehicle 2.

The various kinds of actuators 24 include a plurality of actuators configured to operate the vehicle 2. Specifically, each actuator 24 includes a drive device (for example, at least any one of an internal combustion engine and a motor) for driving the vehicle 2, a steering device (for example, a steering motor) for steering the vehicle 2, and a braking device (for example, a brake actuator) for braking the vehicle 2. The actuators 24 are connected to the ECU 11 through the in-vehicle network 15 and are operated in response to a drive signal from the ECU 11.

The out-of-vehicle communication module 25 is an example of a communication unit configured to communicate with apparatuses outside the vehicle. The out-of-vehicle communication module 25 is an apparatus configured to perform wireless communication with, for example, the apparatuses outside the vehicle such as a server outside the vehicle, other vehicles, and a mobile terminal. The out-of-vehicle communication module 25 includes, for example, a data communication module (DCM) and a short-range wireless communication module (for example, a WiFi module or a Bluetooth (registered trademark) module). The data communication module communicates with the server 3 through the wireless base station 5 and the communication network 4. The short-range wireless communication module communicates directly with the mobile terminal.

The server 3 is provided outside the vehicle 2 and communicates with the vehicle 2 traveling in the specific area through the communication network 4 and the wireless base station 5. The server 3 receives various kinds of information from the vehicles 2 traveling in the specific area, predicts a future change in the traffic state of the road in the area based on the received information, and provides the prediction result of the traffic state to the vehicles traveling in the area. The server 3 is managed by a service provider that provides traffic information.

Figure 3:
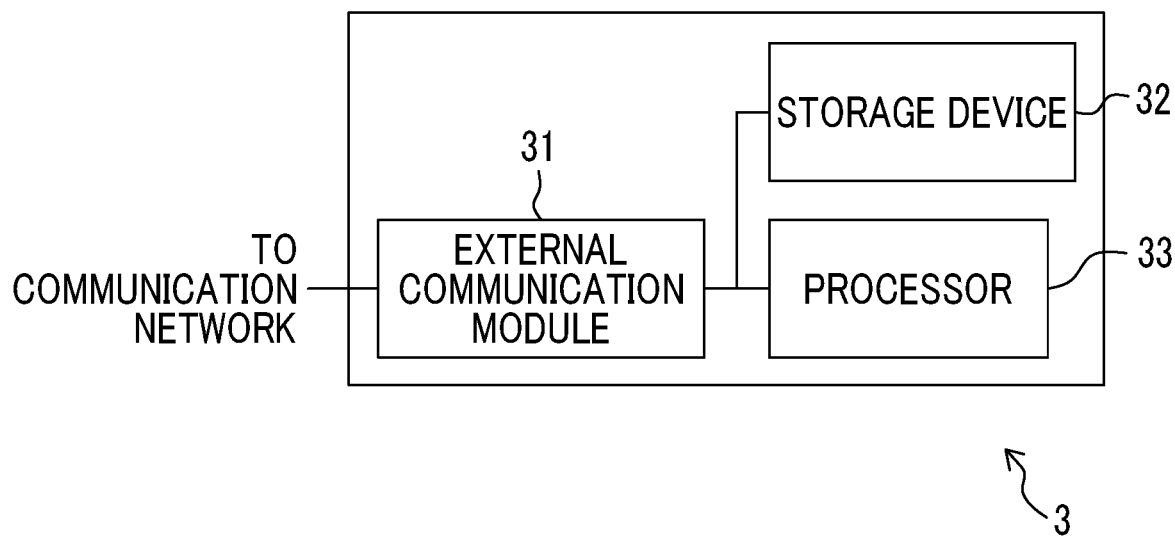
FIG. 3 is a diagram schematically showing a configuration of a server.

FIG. 3 is a diagram schematically showing a configuration of the server 3. As shown in FIG. 3, the server 3 includes an external communication module 31, a storage device 32, and a processor 33. The server 3 may include an input device such as a keyboard and a mouse and an output device such as a display.

The external communication module 31 is an example of a communication unit configured to communicate with an apparatus outside the server 3. The external communication module 31 includes an interface circuit for connecting the server 3 to the communication network 4. The external communication module 31 is configured to be able to communicate with each of the vehicles 2 through the communication network 4 and the wireless base station 5.

The storage device 32 is an example of a storage unit configured to store data. The storage device 32 includes, for example, a hard disk drive (HDD), a solid state drive (SSD), or an optical recording medium. The storage device 32 stores a computer program for executing various kinds of processing by the processor 33 or various kinds of data used when various kinds of processing are executed by the processor 33.

The processor 33 includes one or a plurality of CPUs and peripheral circuits of the CPUs. The processor 33 may further include a GPU or an arithmetic circuit such as a logical arithmetic unit or a numerical arithmetic unit. The processor 33 executes various kinds of processing based on the computer program stored in the storage device 32.

Mobility Service

Some of the vehicles 2 that autonomously travel provide a mobility service together with the server 3. Hereinafter, the mobility service provided by such vehicles 2 will be briefly described with reference to FIG. 4.

Figure 4:
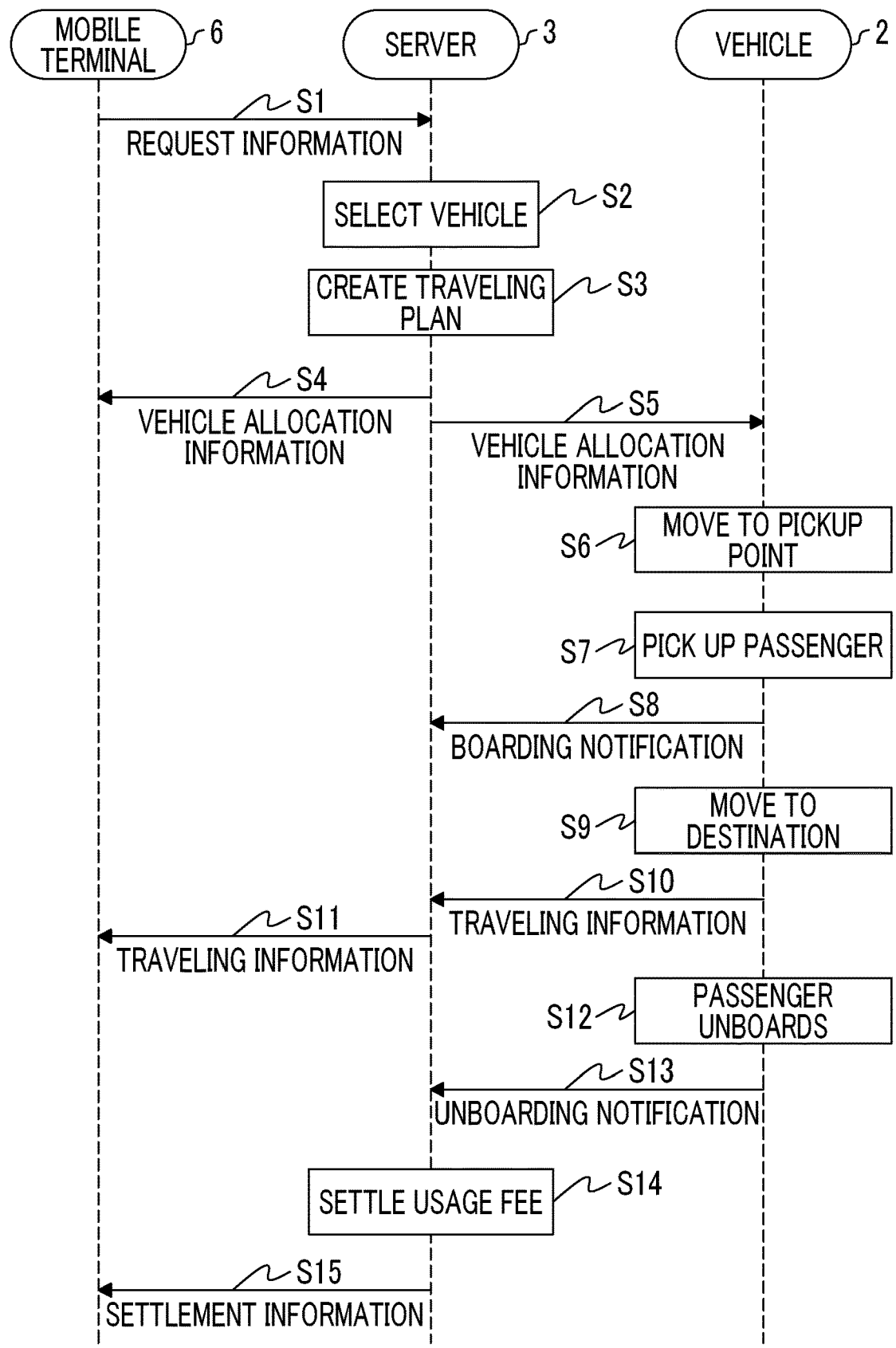
FIG. 4 is a sequence diagram showing a series of flows of processing in a mobility service provided by the server and a vehicle that autonomously travels.

FIG. 4 is a sequence diagram showing a series of flows of processing in the mobility service provided by the server 3 and the vehicles 2 that autonomously travel. In this sequence diagram, the mobile terminal 6 operated by a user is configured to be able to mutually communicate with the server 3 through the wireless base station 5 and the communication network 4.

The user who uses the mobility service operates the mobile terminal 6 to input request information to the mobile terminal 6. The input of the request information is performed, for example, on an application for the mobility service installed in the mobile terminal 6. When the request information is input to the mobile terminal 6, the mobile terminal 6 transmits the request information to the server 3 (step S1). The request information includes, a pickup point (for example, a current position of the user), a destination, identification information of the user (for example, a registration number of the user), fellow passenger information (the number of people to board, and the like), availability of ridesharing with another person, and the like. The pickup point means a desired boarding position of the user.

When the server 3 receives the request information from the user through the mobile terminal 6, the server 3 selects a vehicle 2 suitable for user transportation (step S2). The vehicle 2 suitable for the user transportation is, for example, a vehicle 2 on standby which is closest to the pickup point. When the user permits the ridesharing with another person, a vehicle 2 being used by another user may be selected.

The server 3 creates a traveling plan for the user transportation (step S3). The traveling plan includes a scheduled arrival time at the pickup point, a traveling route to the destination, a scheduled arrival time at the destination, and the like.

Next, the server 3 transmits vehicle allocation information to the mobile terminal 6 (step S4). The vehicle allocation information transmitted to the mobile terminal 6 includes the scheduled arrival time at the pickup point, the traveling route to the destination, the scheduled arrival time at the destination, identification information (license plate number, vehicle type, color, and the like) of the vehicle 2, and the like. The server 3 also transmits similar vehicle allocation information to the vehicle 2 (step S5).

When the vehicle 2 receives the vehicle allocation information from the server 3, the vehicle 2 starts moving to the pickup point (step S6). Thereafter, when the vehicle 2 arrives at the pickup point, the vehicle 2 picks up a passenger (the user, or the user and a fellow passenger) (step S7).

After the passenger boards, the vehicle 2 notifies the server 3 that the passenger boards. Specifically, the vehicle 2 transmits a boarding notification to the server 3 (step S8). After the passenger boards, the vehicle 2 starts moving to the destination (step S9).

The vehicle 2 transmits traveling information to the server 3 at predetermined intervals while moving to the destination (step S10). The traveling information transmitted to the server 3 includes the current position of the vehicle 2, the surrounding information of the vehicle 2, and the like. The server 3 transmits the traveling information to the mobile terminal 6 at predetermined intervals while moving to the destination (step S11). The traveling information transmitted to the mobile terminal 6 includes the current position of the vehicle 2, the scheduled arrival time at the destination, congestion information on the traveling route, and the like.

Thereafter, when the vehicle 2 arrives at the destination, the passenger unboards the vehicle 2 (step S12). After the passenger unboards, the vehicle 2 notifies the server 3 that the passenger unboards. Specifically, the vehicle 2 transmits an unboarding notification to the server 3 (step S13).

After the passenger unboards, the server 3 settles a usage fee for the mobility service (step S14). For example, the server 3 settles the usage fee by account transfer or credit card settlement based on user information. After the usage fee is settled, the vehicle 2 transmits settlement information including settlement contents to the mobile terminal 6 (step S15).

The autonomously traveling vehicle 2 that provides the mobility service travels toward any destination set by the server 3 in a state where there is no request from the user, that is, in a standby state. For example, the server 3 sets the destination of the vehicle 2 on standby such that the demand from the user and the supply of the vehicle 2 can be balanced. Specifically, since there is a great demand from users in a region near a station or a commercial facility, the server 3 performs the vehicle allocation such that the number of vehicles 2 on standby increases in such a region. When a vehicle 2 on standby arrives at the destination, the server 3 may be configured to stop the vehicle 2 in a predetermined parking space around the destination. Alternatively, when there is no parking space around the destination, the server 3 may be configured to cause the vehicle 2 to autonomously travel so as to turn around the destination.

Therefore, in any case, the autonomously traveling vehicle 2 capable of providing the mobility service is configured to move toward the destination set by the user or the destination set by the server 3.

Prediction of Traffic State

Next, the traffic information processing system according to this embodiment will be described with reference to FIGS. 5 and 6. As described above, the server 3 of the traffic information processing system predicts the future change in the traffic state on the road in the area based on the information transmitted from the vehicles 2 traveling in the specific area to the server 3. Here, examples of the traffic state of the road include a congestion state, a crowded state, and the like of the road. Hereinafter, a case will be described as an example in which the traffic information processing system predicts the future change in the congestion state on a road in a specific area.

Figure 5:
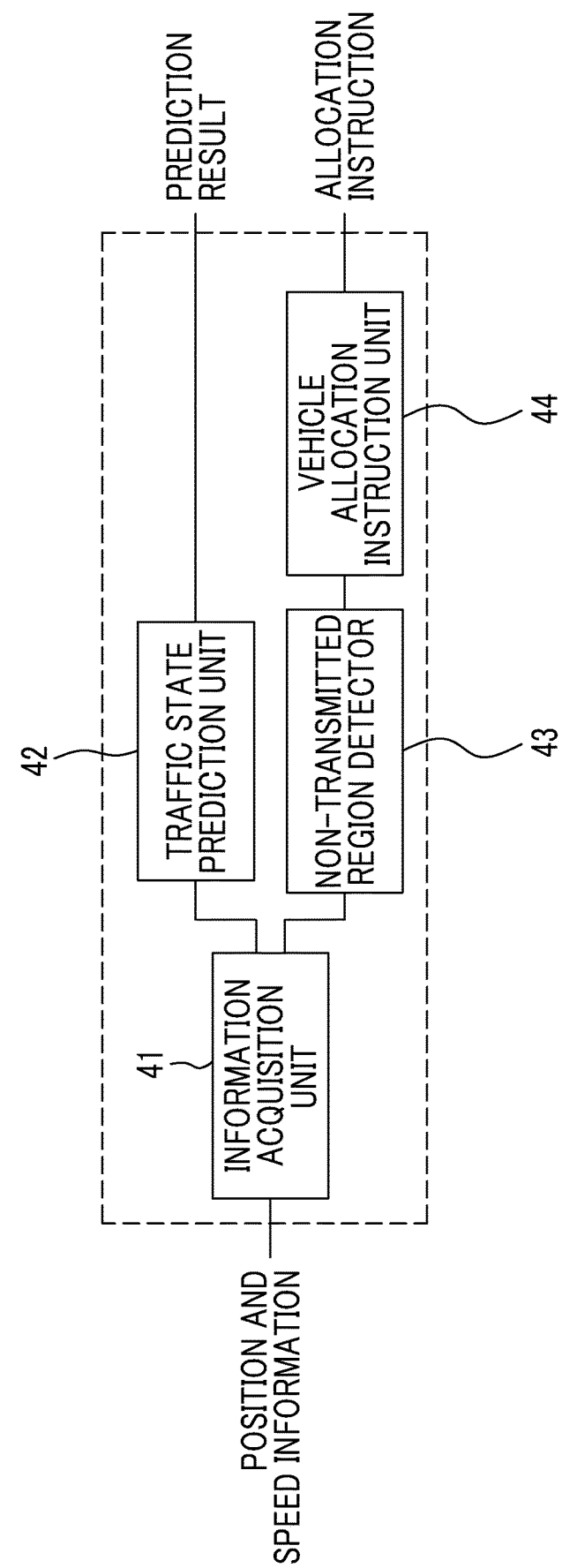
FIG. 5 is a functional block diagram of a processor of the server relating to traffic information processing.

FIG. 5 is a functional block diagram of the processor 33 of the server 3 relating to traffic information processing. The processor 33 includes an information acquisition unit 41, a traffic state prediction unit 42, a non-transmitted region detector 43, and a vehicle allocation instruction unit 44. The functional blocks included in the processor 33 are, for example, functional modules realized by a computer program that operates on the processor 33. The functional blocks may be dedicated arithmetic circuits provided in the processor 14.

The information acquisition unit 41 acquires position information and speed information (hereinafter referred to as "position and speed information") of the vehicle 2 from each of the vehicles 2 traveling in the specific area and position and speed information of other vehicles around the vehicle 2 through the external communication module 31. The information acquisition unit 41 transmits the acquired position and speed information to the traffic state prediction unit 42 and the non-transmitted region detector 43.

As described above, in each vehicle 2, the current position of the host vehicle is detected by the positioning sensor 21, and the detected current position of the host vehicle is transmitted to the ECU 11. In addition, in each vehicle 2, the speed of the host vehicle is detected by the speed sensor 23, and the detected speed of the host vehicle is transmitted to the ECU 11.

Further, in each vehicle 2, the surrounding information of the vehicle 2 is detected by the out-of-vehicle sensor 22. Such surrounding information of the vehicle 2 includes the position information and speed information of other vehicles traveling or stopped around the vehicle 2.

For example, image recognition processing is performed on an image captured by the out-of-vehicle camera which is an example of the out-of-vehicle sensor 22 to recognize other vehicles imaged in the image. Relative positions of other vehicles recognized in a plurality of images with respect to the host vehicle are obtained by using a plurality of such out-of-vehicle cameras. A change in the relative positions of other vehicles with respect to the host vehicle is obtained based on time-series data of images imaged by the out-of-vehicle cameras. The speeds of other vehicles traveling or stopped around the vehicle 2 are obtained based on the change in the relative positions and the speed of the host vehicle.

Alternatively, objects around the vehicle 2 are recognized based on distance information to the objects around the vehicle 2 detected by the LIDAR, which is an example of the out-of-vehicle sensor 22. The relative positions of other vehicles traveling or stopped around the host vehicle with respect to the host vehicle are obtained based on the distance information to the objects recognized as the vehicles among such objects. Further, the change in the relative positions of other vehicles with respect to the host vehicle is obtained based on time-series data of the distance information detected by the LIDAR. The speeds of other vehicles traveling or stopped around the vehicle 2 are obtained based on the change in the relative positions and the speed of the host vehicle.

The position and speed information of the vehicle 2 and the position and speed information of other vehicles around the vehicle 2 which are obtained for each vehicle 2 in this manner are transmitted from the out-of-vehicle communication module 25 of the vehicle 2 to the server 3 through the wireless base station 5 and the communication network 4. In the server 3, the position and speed information is received by the external communication module 31 and acquired by the information acquisition unit 41 of the processor 33.

The traffic state prediction unit 42 receives the position and speed information of the vehicle 2 and other vehicles around the vehicle 2 acquired by the information acquisition unit 41 from the information acquisition unit 41. The traffic state prediction unit 42 predicts the future change in the congestion state of the road in the specific area described above based on the position and speed information and transmits the prediction result of the congestion state to the vehicle 2 through the external communication module 31.

More specifically, the traffic state prediction unit 42 receives information needed for the prediction of the congestion on a road in a specific area. Such information includes at least any one of road information and weather information of each road in addition to the position and speed information received from the information acquisition unit 41. The road information includes, for example, at least any one of road gradient, speed limit, presence or absence of a tunnel or a bridge, presence or absence of a street lamp, a change in the number of lanes, road branching or merging information, and the like. The road information is stored in, for example, the storage device 32 of the server 3. The weather information is acquired by, for example, the information acquisition unit 41 through the communication network 4.

The traffic state prediction unit 42 predicts the future change in the congestion state of the road in the specific area based on the pieces of information input in this way. Specifically, for example, the traffic state prediction unit 42 calculates, for each point on the road in the specific area, density of the vehicles traveling at the point (the number of vehicles per unit distance) and an average speed of the vehicles traveling at the point based on the position and speed information of the vehicle 2 and the position and speed information of other vehicles around the vehicle 2 that provide the pieces of information to the server 3.

Here, when the density of the vehicles at a certain point on the road is equal to or higher than a constant value and the average speed of the vehicles traveling at the point continues to be equal to or less than a constant value (for example, 5 km/h), the point is determined to be congested. On the other hand, when the density of the vehicles at a certain point on the road is less than a constant value or when the average speed of the vehicles traveling at the point continues to be higher than the constant value, the point is determined to be not congested.

The traffic state prediction unit 42 predicts whether the congestion will occur in the future at each point determined to be not congested, based on the density or average speed of the vehicles at the point. For example, when the density of the vehicles changes to be increased or when the average speed of the vehicles changes to be decreased, the traffic state prediction unit 42 determines that there is a high possibility that the congestion occurs at the point. For example, when the weather is bad, the traffic state prediction unit 42 determines that there is a high possibility that the congestion occurs at the point compared with when the weather is good. In addition, the traffic state prediction unit 42 predicts whether the congestion occurs at the point according to the road information at or around the point. For example, when there is a tunnel or a bridge at or around the point, determination is made that there is a high possibility that the congestion occurs at the point compared with when there is no tunnel or bridge. Similarly, for example, when there is a slope with a large climbing gradient at or around the point, determination is made that there is a high possibility that the congestion occurs at the point compared with when there is no slope.

The traffic state prediction unit 42 has, for example, a learned neural network with the density and average speed of the vehicles at a certain point, the road information, and the weather information as the inputs and with the future change in the congestion state at the point as an output. Therefore, when the parameters are input, the traffic state prediction unit 42 outputs the future change in the congestion state. Specifically, for example, when the congestion is predicted at a target point, a time when the congestion reaches the point is output. On the other hand, when the congestion already occurs at the target point and the congestion is predicted to be resolved, a time when the congestion is resolved at the point is output.

The learning of such a neural network is performed based on the density and average speed of the vehicles, road information, and weather information at each point on the road calculated from the position and speed information provided from the vehicles 2. Specifically, based on the density and average speed of the vehicles at a predetermined time at a predetermined point, determination is made whether there is the congestion at the time at the point (congestion state). The learning of the neural network is performed with the position and speed information of the vehicles, the road information, and the weather information at the point before a predetermined time from the time, and the congestion information indicating whether there is the congestion at the time (that is, after the predetermined time), as training data.

The traffic state prediction unit 42 performs the congestion prediction using the machine learning of the neural network, but may perform the congestion prediction using machine learning of other methods. The traffic state prediction unit 42 may perform the congestion prediction based on a calculation equation or the like obtained in advance without using the machine learning.

The traffic state prediction unit 42 transmits the prediction result of the future change in the congestion state to each vehicle 2 through the external communication module 31, the communication network 4, and the wireless base station 5. The traffic state prediction unit 42 may transmit the prediction result of the congestion state not only to the vehicle 2 that provides the position and speed information to the server 3 but also a vehicle that does not provide such information (for example, vehicle including a communication apparatus, but not including an out-of-vehicle sensor or the like).

In the autonomously traveling vehicle 2 that provides the mobility service, the traveling plan may be changed based on the prediction result of the congestion state provided by the traffic state prediction unit 42. Even for the vehicle that does not travel autonomously, a recommended traveling route in a navigation system mounted on the vehicle may be changed based on the prediction result of the congestion state provided by the traffic state prediction unit 42.

The non-transmitted region detector 43 detects the presence or absence of a non-transmitted region in which the position and speed information from the vehicle 2 is not transmitted over a predetermined reference time, set in advance, or more in the specific area described above. That is, the non-transmitted region detector 43 receives the position and speed information of the vehicle 2 and other vehicles around the vehicle 2 from the information acquisition unit 41. The non-transmitted region detector 43 transmits the detected non-transmitted region to the vehicle allocation instruction unit 44.

Specifically, the non-transmitted region detector 43 detects, for constant time intervals (for example, every minute), whether there is a non-transmitted region in which the position and speed information is not received from the vehicle 2 over the predetermined reference time or more in a specific area. The reference time is a time when the accuracy of the congestion prediction is lowered in a case where there is no position and speed information and is, for example, five minutes.

When the non-transmitted region is detected by the non-transmitted region detector 43, the vehicle allocation instruction unit 44 sets a destination of one vehicle 2 not boarded by the user among the autonomously traveling vehicles 2 that provide the mobility service at a position in the non-transmitted region described above. That is, the vehicle allocation instruction unit 44 receives the non-transmitted region in the specific area described above from the non-transmitted region detector 43. The vehicle allocation instruction unit 44 performs a vehicle allocation instruction to set the destination in the non-transmitted region with respect to the specific vehicle 2.

Specifically, when the non-transmitted region is detected by the non-transmitted region detector 43, the vehicle allocation instruction unit 44 searches for an autonomously traveling vehicle that travels near the non-transmitted region and provides the mobility service. Then, the vehicle allocation instruction unit 44 selects one vehicle not boarded by the user among the searched vehicles and sets the destination of the selected vehicle 2 at a predetermined position in the non-transmitted region. When the non-transmitted region exists over a long section, the vehicle allocation instruction unit 44 sets the destination of the selected vehicle 2 at a plurality of positions in the non-transmitted region.

When a road in one advancing direction is congested on the road around the non-transmitted region, the vehicle allocation instruction unit 44 sets the destination on the road in the non-transmitted region and in an advancing direction opposite to the above advancing direction. Specifically, the vehicle allocation instruction unit 44 receives, for example, information on whether there is the congestion on the road around the non-transmitted region from the traffic state prediction unit 42. When there is no congestion on the road around the non-transmitted region, the vehicle allocation instruction unit 44 sets the destination of the autonomously traveling vehicle 2, that is closest to the non-transmitted region and provides the mobility service, on the road in the non-transmitted region regardless of a traveling direction. On the other hand, when there is the congestion on the road around the non-transmitted region, the vehicle allocation instruction unit 44 sets the destination of a vehicle 2, that travels on a road in the advancing direction where there is no congestion (or light congestion) among the roads around the non-transmitted region and is most accessible to the non-transmitted region, on the road in the non-transmitted region. In this case, as described above, the vehicle allocation instruction unit 44 sets the destination on the road in the non-transmitted region and in an advancing direction in which the congestion does not occur.

Here, as described above, the position and speed information of the vehicle and other vehicles around the vehicle is transmitted to the server 3 from many vehicles 2 traveling in a specific area. Therefore, the server 3 has the position and speed information of the vehicles traveling at many points on the road in the specific area. However, when there is a region in which the vehicle 2 that can provide the position and speed information does not travel over a certain amount of time, the position and speed information from the vehicle 2 is not transmitted from the region over the time. As a result, the information about the point is insufficient, and the prediction accuracy in the congestion prediction is lowered.

According to this embodiment, the autonomously traveling vehicle 2 that provides the mobility service heads for the non-transmitted region in which the position and speed information is not provided over the reference time or more. As a result, the position and speed information is provided for the non-transmitted region, and thus the prediction accuracy in the congestion prediction can be improved.

On a road where there is the congestion in front and rear of the non-transmitted region, there is a high possibility that the congestion occurs also in the non-transmitted region. When the vehicle 2 heads for the non-transmitted region on such a road through a road in the same advancing direction as the advancing direction where the congestion occurs, the vehicle 2 is delayed from reaching the non-transmitted region due to the congestion. According to this embodiment, when there is the congestion on the road in one advancing direction, the vehicle 2 reaches the non-transmitted region through the road in the advancing direction opposite to the one advancing direction. Therefore, the information can be quickly acquired in the non-transmitted region.

Operation and Effect

According to this embodiment, the information acquisition unit 41 acquires the position and speed information of other vehicles around the vehicle 2 in addition to the vehicle 2 that can communicate with the server 3. In this case, other vehicles around the vehicle 2 include vehicles having opposite advancing directions in addition to vehicles having the same advancing direction. Therefore, the traffic state prediction unit 42 can predict the traffic state based on the position and speed information of a very large number of vehicles 2, and thus it is possible to increase the prediction accuracy of the traffic state.

Flowchart

Figure 6:
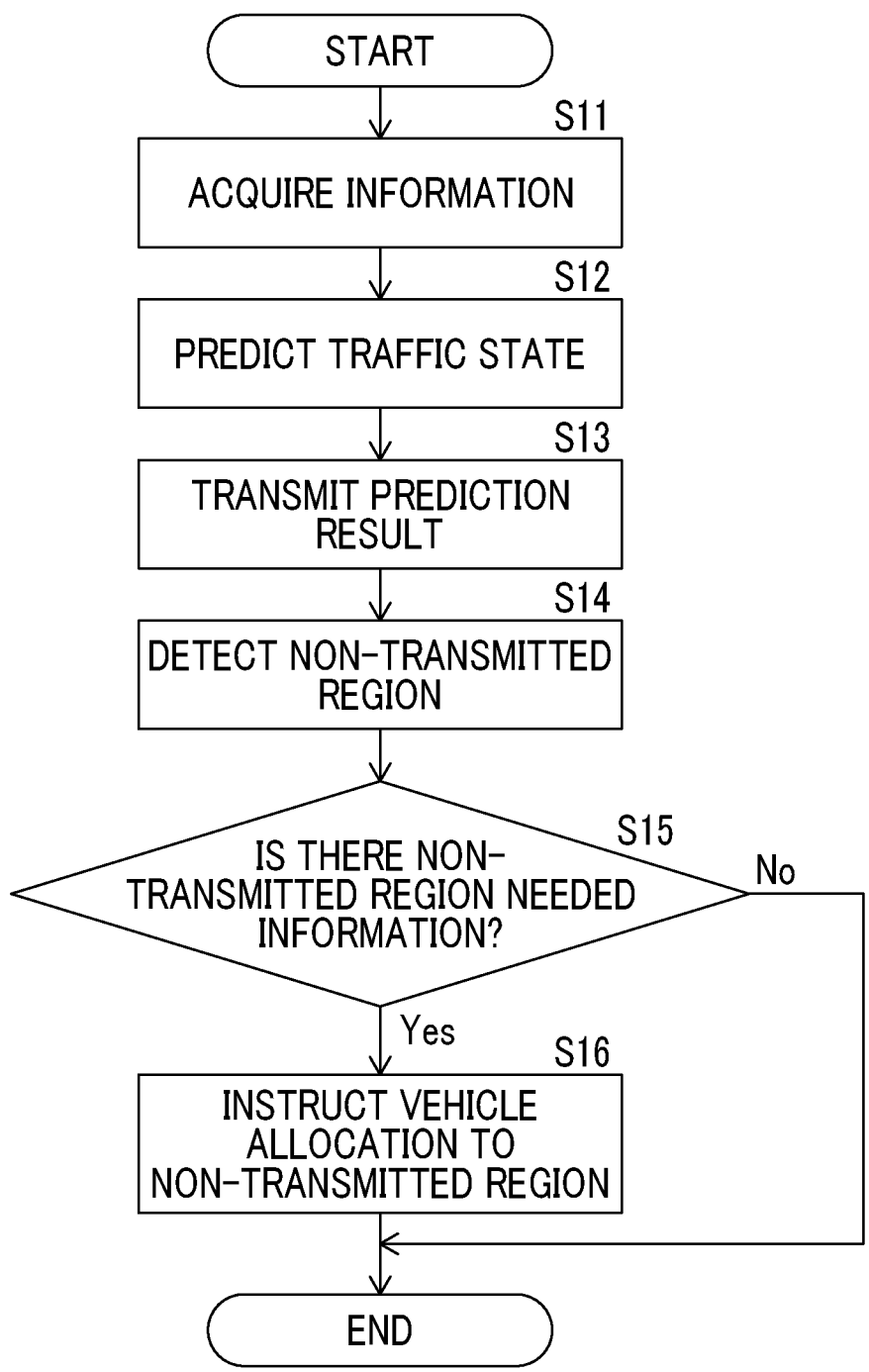
FIG. 6 is a flowchart showing a processing procedure of traffic information such as congestion information.

FIG. 6 is a flowchart showing a processing procedure of the traffic information such as the congestion information. The illustrated processing is executed by the processor 33 of the server 3.

First, in step S11, the information acquisition unit 41 acquires the position and speed information of the vehicle 2 and the position and speed information of the vehicles around the vehicle 2 from each of the vehicles 2 traveling in a specific area. The information acquisition unit 41 also acquires the weather information and the like in the specific area through the communication network 4.

Next, in step S12, the traffic state prediction unit 42 predicts the future change in the traffic state of a road in a specific area based on the position and speed information, weather information, and road information acquired by the information acquisition unit 41. In step S13, the traffic state prediction unit 42 transmits the prediction result of the traffic state in step S12 to the vehicle 2 with a communication apparatus traveling in the specific area.

Next, in step S14, the non-transmitted region detector 43 detects a non-transmitted region in which the position and speed information is not transmitted from the vehicle 2 over the reference time in a specific area based on the position and speed information acquired by the information acquisition unit 41.

In step S15, determination is made whether the non-transmitted region is detected by the non-transmitted region detector 43. When determination is made that the non-transmitted region is not detected in step S15, the routine is ended. On the other hand, when determination is made that the non-transmitted region is detected, the processing proceeds to step S16.

In step S16, the vehicle allocation instruction unit 44 sets the destination of one vehicle 2 not boarded by the user among the autonomously traveling vehicles that provide the mobility service at a position in the non-transmitted region. As a result, the vehicle 2 moves toward the non-transmitted region. When the vehicle 2 reaches the non-transmitted region, the position and speed information of the vehicle 2 in the non-transmitted region and the position and speed information of other vehicles around the vehicle in the non-transmitted region are transmitted to the server 3. For this reason, the non-transmitted region is not detected as a non-transmitted region by the non-transmitted region detector 43 in step S14 in the subsequent routine.

Second Embodiment

Next, a traffic information processing system according to a second embodiment will be described with reference to FIG. 7. Since the traffic information processing system according to the second embodiment is basically the same as the traffic processing system according to the first embodiment, the following description will focus on differences from the traffic processing system according to the first embodiment.

Figure 7:
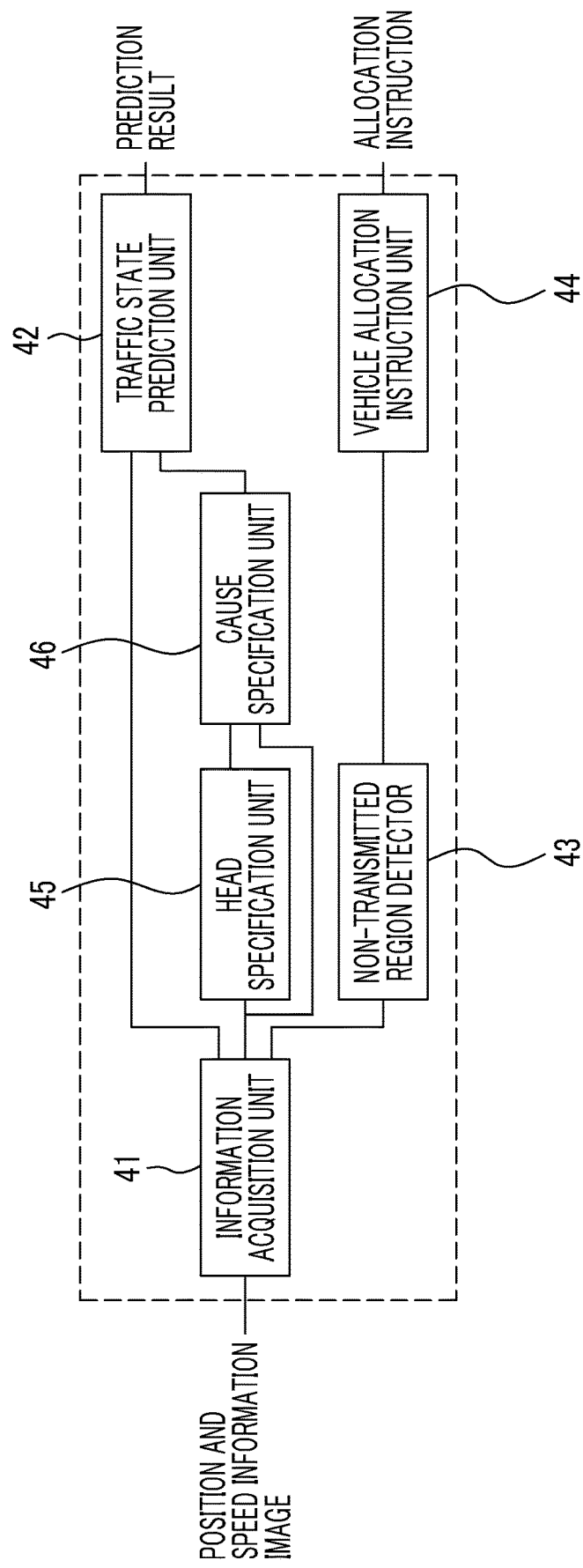
FIG. 7 is a functional block diagram of a processor of the server relating to the traffic information processing.

FIG. 7 is a functional block diagram of the processor 33 of the server 3 relating to the traffic information processing. The processor 33 includes a head specification unit 45 and a cause specification unit 46 in addition to the information acquisition unit 41, the traffic state prediction unit 42, the non-transmitted region detector 43, and the vehicle allocation instruction unit 44. The functional blocks included in the processor 33 are, for example, functional modules realized by a computer program that operates on the processor 33.

In this embodiment, the information acquisition unit 41 acquires an image of the surroundings of the vehicle 2 imaged by the out-of-vehicle camera that is one of the out-of-vehicle sensors 22 from each of the vehicles 2 traveling in a specific area in addition to the position and speed information through the external communication module 31. The information acquisition unit 41 may be configured to always acquire images from all the vehicles 2 traveling in the specific area. Alternatively, the information acquisition unit 41 may be configured such that the image may be acquired only from a vehicle 2 traveling near a head position of the congestion specified by the head specification unit 45 described below.

The head specification unit 45 receives the position and speed information of the vehicle 2 and other vehicles around the vehicle 2 acquired by the information acquisition unit 41 from the information acquisition unit 41. The head specification unit 45 specifies the head position of the congestion that occurs on the road in the specific area described above based on the position and speed information. The specification result of the head position of the congestion by the head specification unit 45 is transmitted to the cause specification unit 46.

Similar to the traffic state prediction unit 42, the head specification unit 45 calculates, for each point on the road in the specific area, density of the vehicles traveling at the point and an average speed of the vehicles traveling at the point based on the position and speed information transmitted from the information acquisition unit 41. The head specification unit 45 determines whether the congestion occurs at the point based on the density and average speed of the vehicles at the point.

Next, when determination is made that the congestion occurs continuously at a plurality of points on the road, the head specification unit 45 specifies a point at the top of the continuous points as the head position of the congestion. By performing the same processing for all points where the congestions occur in the specific area, the head specification unit 45 can specify the head position of the congestions occurring in the specific area.

The cause specification unit 46 receives the head position of the congestion specified by the head specification unit 45 and the image of the out-of-vehicle camera of each vehicle 2 acquired by the information acquisition unit 41. The cause specification unit 46 specifies a cause of the congestion based on the image acquired by the information acquisition unit 41 in relation to the road near the head of the congestion specified by the head specification unit 45. The cause specification unit 46 transmits the cause of the congestion specified by the cause specification unit 46 to the traffic state prediction unit 42.

The cause specification unit 46 specifies the cause of the congestion based on the image of the road near the head of the congestion. For example, when an accident vehicle or a disabled vehicle appears in the image of the road near the head of the congestion, an accident or the disabled vehicle is specified as the cause of the congestion. When a state of construction appears in the image of the road near the head of the congestion, the construction is specified as the cause of the congestion. Alternatively, when an object that interrupts the traffic appears in the image of the road near the head of the congestion, the falling object is specified as the cause of the congestion. When there is nothing special in the image of the road near the head of the congestion, natural congestion is specified as the cause of the congestion.

The specification of the congestion cause based on the image in the cause specification unit 46 may be performed by, for example, image processing using the machine learning method such as the neural network. Alternatively, the congestion cause may be input by an operator who views the image. The cause specification unit 46 may predict a time needed for removing the congestion cause in addition to specifying the congestion cause. The cause specification may function as a part of the traffic state prediction unit 42.

In this embodiment, the traffic state prediction unit 42 estimates the future change in the traffic state of the road based on the specified congestion cause in addition to the position and speed information transmitted from the information acquisition unit 41, the road information, and the weather information. For example, when the congestion cause is due to an accident, completion of accident processing usually takes a long time. Therefore, at each point on the road upstream of a point where the accident occurs, the congestion at the point is predicted to last longer than usual.

According to this embodiment, when the traffic state prediction unit 42 predicts the traffic state, the cause of the congestion occurring on a road in a specific area is referred to. Therefore, it is possible to accurately estimate the future change in the traffic state.

When the image is not acquired by the information acquisition unit in relation to the road near the head of the congestion, the vehicle allocation instruction unit 44 may be configured to set the destination of one vehicle 2 not boarded by the user among the autonomously traveling vehicles 2 that provide the mobility service at the head position (or position near the head position) of the congestion.

In this case, the specification result of the head position of the congestion by the head specification unit 45 is transmitted from the head specification unit 45 to the vehicle allocation instruction unit 44. In this case, for example, the vehicle allocation instruction unit 44 searches for the autonomously traveling vehicle that is traveling on the road closest to the head position of the congestion where the image of the road near the head position is not imaged and provides the mobility service. The vehicle allocation instruction unit 44 selects one vehicle not boarded by the user among the vehicles detected by the search and sets the destination of the selected vehicle 2 at the head position of the congestion.

As described above, when the image near the head position of the congestion is not imaged, the congestion cause can be specified by allocating the vehicle 2 near the head position thereof and imaging an image. As a result, it is possible to improve the prediction accuracy of the traffic state in the traffic state prediction unit 42.

The preferred embodiments according to the disclosure have been described above. However, the disclosure is not limited to these embodiments, and various modifications and changes can be made within the scope of the claims.

What is claimed is:

1. A traffic information processing device comprising:
a communication unit configured to communicate through a communication network with a plurality of communication vehicles configured to detect relative positions and relative speeds of vehicles around a host vehicle with respect to the host vehicle;
an information acquisition unit configured to acquire position and speed information of the communication vehicle and position and speed information of vehicles around the communication vehicle from each of the communication vehicles traveling in a predetermined area through the communication unit; and
a traffic state prediction unit configured to predict a future change in a traffic state of a road in the area based on the position and speed information from the communication vehicles acquired by the information acquisition unit,
wherein at least some of the communication vehicles are autonomously traveling vehicles configured to provide mobility services and autonomously travel toward set destinations,
the device further comprising:
a vehicle allocation instruction unit configured to set the destination of one autonomously traveling vehicle not boarded by a user at a position in a non-transmitted region in which the position and speed information from the communication vehicles are not transmitted over a predetermined time or more when the non-transmitted region is present in the area.

2. The traffic information processing device according to claim 1, wherein when a road in one advancing direction is congested on the road around the non-transmitted region, the vehicle allocation instruction unit sets the destination on the road in the non-transmitted region and in an advancing direction opposite to the one advancing direction.

3. The traffic information processing device according to claim 1, wherein the traffic state of the road is a congestion state of the road.

4. The traffic information processing device according to claim 2, wherein the traffic state prediction unit predicts a future change in the congestion state of the road based on road information and weather information of each road in addition to the position and speed information.

5. The traffic information processing device according to claim 1, wherein the traffic state prediction unit transmits a prediction result of the traffic state to the communication vehicles through the communication unit.

6. The traffic information processing device according to claim 1, the device further comprising:
a head specification unit configured to specify a head position of congestion occurring on a road in the area based on the position and speed information from the communication vehicles acquired by the information acquisition unit,
wherein the communication vehicle is provided with an out-of-vehicle camera that images surroundings of the communication vehicle,
wherein the information acquisition unit further acquires an image captured by the out-of-vehicle camera from the communication vehicle traveling in the predetermined area, and
wherein the traffic state prediction unit specifies a cause of the congestion based on the image acquired by the information acquisition unit in relation to a road near the congestion head specified by the head specification unit and estimates the future change in the traffic state of the road based on the specified congestion cause.

7. The traffic information processing device according to claim 6,
wherein at least some of the communication vehicles are the autonomously traveling vehicles configured to provide the mobility services and autonomously travel toward the set destinations,
the device further comprising:
a vehicle allocation instruction unit configured to set the destination of one autonomously traveling vehicle not boarded by a user at a position near the congestion head when the image is not acquired by the information acquisition unit in relation to the road near the congestion head.

8. A traffic information processing device comprising:
a communication unit configured to communicate through a communication network with a plurality of communication vehicles configured to detect relative positions and relative speeds of vehicles around a host vehicle with respect to the host vehicle;
an information acquisition unit configured to acquire position and speed information of the communication vehicle and position and speed information of vehicles around the communication vehicle from each of the communication vehicles traveling in a predetermined area through the communication unit; and
a traffic state prediction unit configured to predict a future change in a traffic state of a road in the area based on the position and speed information from the communication vehicles acquired by the information acquisition unit,
wherein the traffic state of the road is a congestion state of the road.

9. The traffic information processing device according to claim 8, wherein the traffic state prediction unit transmits a prediction result of the traffic state to the communication vehicles through the communication unit.

10. The traffic information processing device according to claim 8, the device further comprising:
a head specification unit configured to specify a head position of congestion occurring on a road in the area based on the position and speed information from the communication vehicles acquired by the information acquisition unit,
wherein the communication vehicle is provided with an out-of-vehicle camera that images surroundings of the communication vehicle,
wherein the information acquisition unit further acquires an image captured by the out-of-vehicle camera from the communication vehicle traveling in the predetermined area, and
wherein the traffic state prediction unit specifies a cause of the congestion based on the image acquired by the information acquisition unit in relation to a road near the congestion head specified by the head specification unit and estimates the future change in the traffic state of the road based on the specified congestion cause.

11. A traffic information processing device comprising:
a communication interface configured to communicate through a communication network with a plurality of communication vehicles configured to detect relative positions and relative speeds of vehicles around a host vehicle with respect to the host vehicle; and
a processor configured to:

acquire position and speed information of the communication vehicle and position and speed information of vehicles around the communication vehicle from each of the communication vehicles traveling in a predetermined area through the communication interface;

predict a future change in a traffic state of a road in the area based on the position and speed information from the communication vehicles, wherein at least some of the communication vehicles are autonomously traveling vehicles configured to provide mobility services and autonomously travel toward set destinations; and set the destination of one autonomously traveling vehicle not boarded by a user at a position in a non-transmitted region in which the position and speed information from the communication vehicles are not transmitted over a predetermined time or more when the non-transmitted region is present in the area.

12. The traffic information processing device according to claim 11, wherein the processor is further configured to:

detect the non-transmitted region in which the position and speed information from the communication vehicles are not transmitted over the predetermined time or more, based on the position and speed information from the communication vehicles; and set the destination of the one autonomously traveling vehicle not boarded by the user at the position in a non-transmitted region, based on determining that the non-transmitted region is detected.

13. The traffic information processing device according to claim 12, wherein the processor is further configured to:

determine that the non-transmitted region, in which the position and speed information from the communication vehicles are not transmitted over the predetermined time or more, is detected based on detecting the non-transmitted region; and set the destination of the one autonomously traveling vehicle not boarded by the user at the position in a non-transmitted region, based on determining that the non-transmitted region is detected.

14. The traffic information processing device according to claim 13, wherein the processor is further configured to:

acquire, from the one autonomously traveling vehicle, position and speed information of vehicles in the non-transmitted region, based on setting the destination of the one autonomously traveling vehicle.

* * * * *